Feb. 10, 1970  R. A. HAMLIN  3,495,252
LIDDING MACHINE
Filed Dec. 28, 1966  3 Sheets-Sheet 1
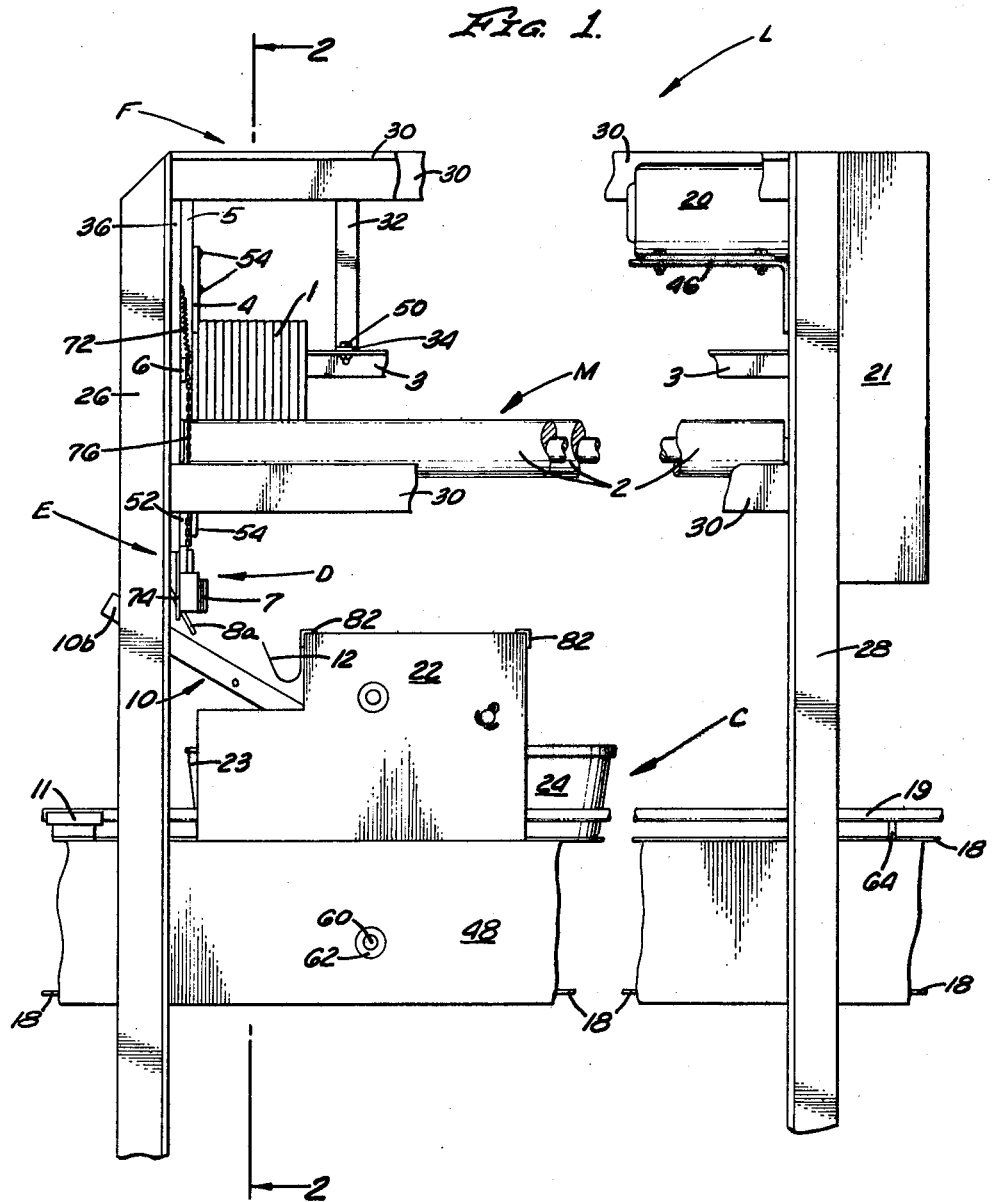
INVENTOR
RUPERT A. HAMLIN
BY John H. Crowe
AGENT

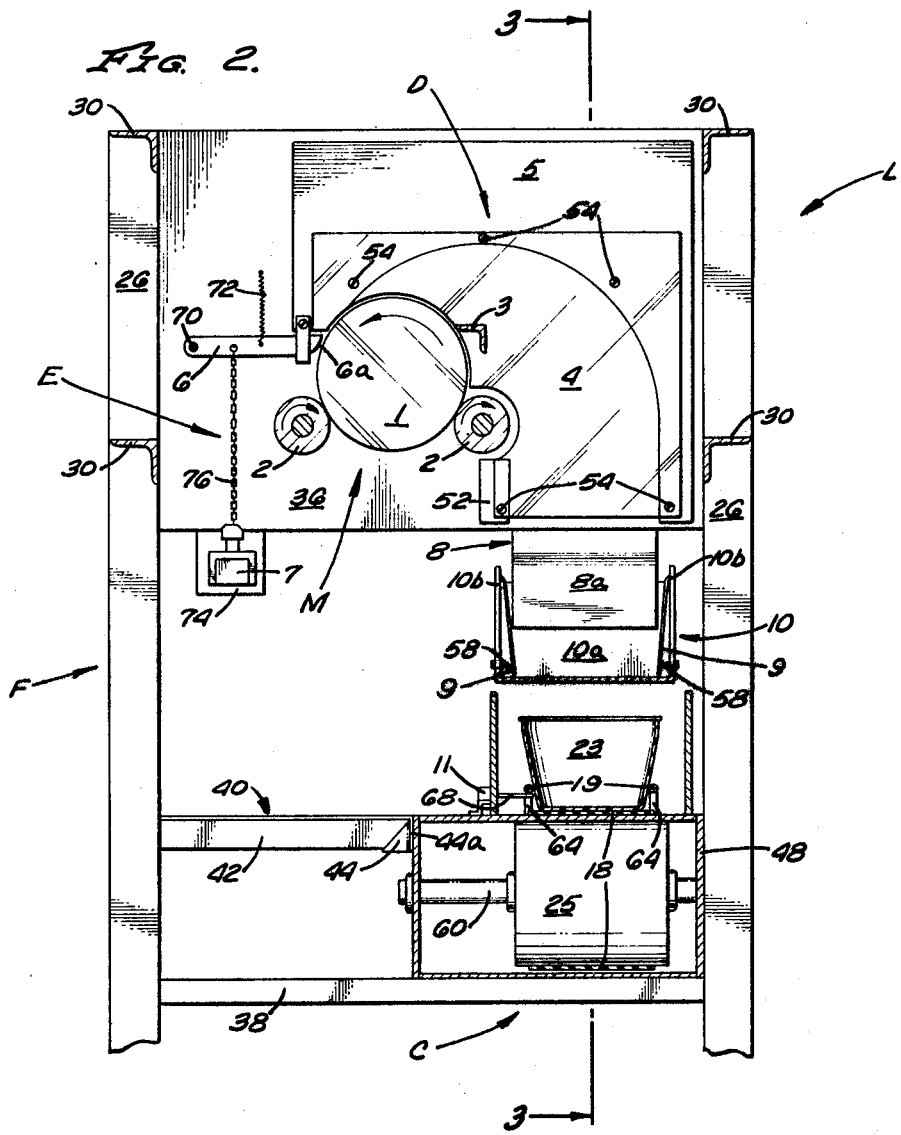

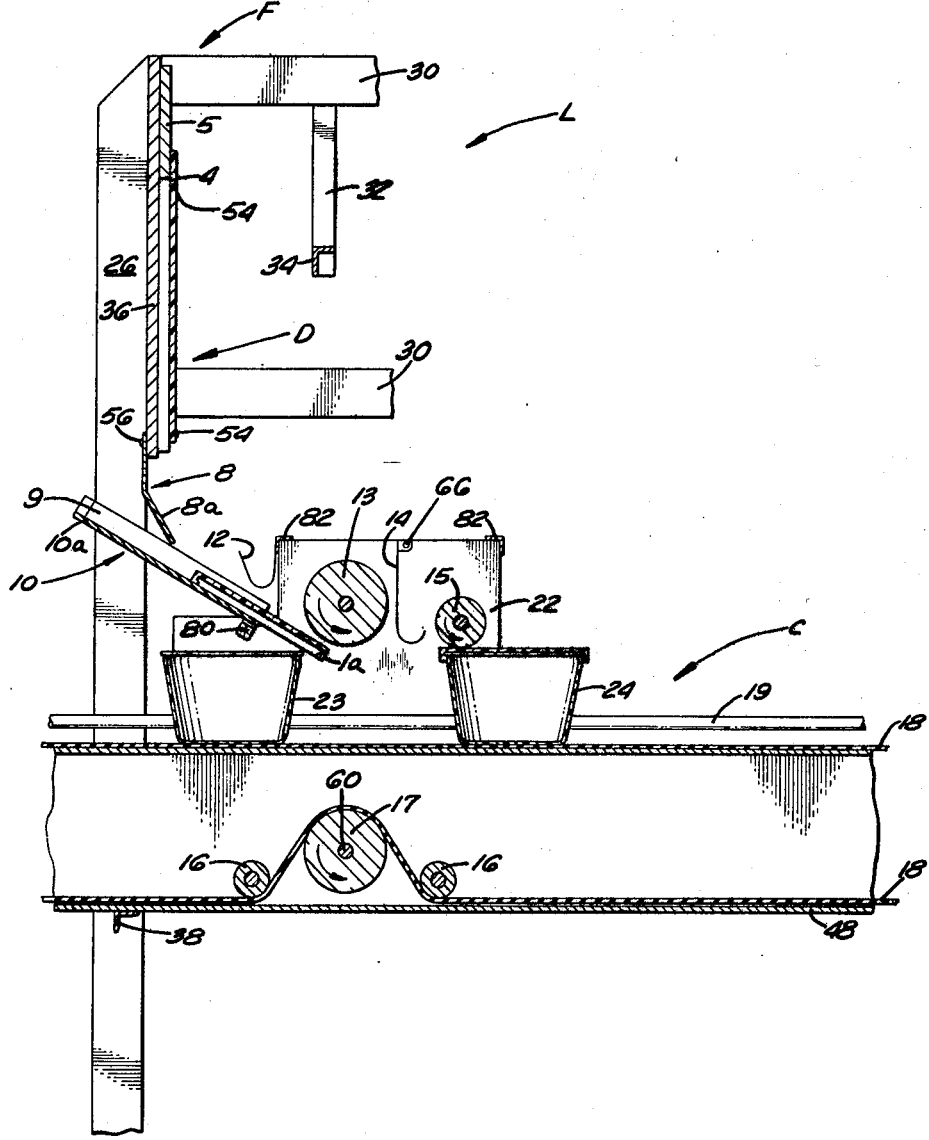

United States Patent Office 3,495,252
Patented Feb. 10, 1970

3,495,252
LIDDING MACHINE
Rupert A. Hamlin, Indio, Calif., assignor to California Date Growers Association, Indio, Calif.
Filed Dec. 28, 1966, Ser. No. 605,295
Int. Cl. B65b 7/28, 57/02
U.S. Cl. 53—70
7 Claims

ABSTRACT OF THE DISCLOSURE

A machine for automatically pressing lids onto containers traveling on a conveyor belt. The lids are maintained in readiness on a pair of rotating rolls, mounted above, and to one side of, the belt. A trigger sequentially urges the lids into contact with a stationary cam which cooperates with one of the rolls to cause the lids to move in the direction of the containers. These movements are timed to route the lids toward individual containers through a trigger-control mechanism actuatable by the containers, with the aid of a microswitch positioned near the conveyor belt which they contact in passing.

---

This invention relates to means for automatically pressing lids on containers, particularly those plastic cup-like containers of the type used for the packaging of dates and like consumer products for sale.

It is thus a principal object of the invention to provide labor saving means for the rapid placement of lids in cuplike containers of food, and other, products being packaged for sale.

Other objects, features and advantages of the invention will appear in the light of the complete description thereof to follow.

I have now devised a lidding machine capable of functioning in such a way as to achieve the above-stated objects in a unique and unprecedented manner. Briefly, the machine operates to receive, in sequence, a plurality of unlidded containers and convey them along a predetermined path while automatically, in response to signals actuated by the moving containers themselves, ejecting lids from a conveniently maintained supply of feed lids, routing the ejected lids to positions of incipient fit on said containers and, finally, pressing the incipiently-fitted lids into tight friction fit on the containers. The machine, and its method of operation, will be better understood by reference to the accompanying drawings, of which:

FIGURE 1 is an interrupted, fragmentary side elevation of a preferred embodiment of a lidding machine in accordance with this invention.

FIGURE 2 is a separate view of the machine, taken mostly in section along line 2—2 of FIGURE 1.

FIGURE 3 is a fragmentary view of the machine taken mostly along line 3—3 of FIGURE 2.

Considering now the drawings in greater detail, the there-illustrated lidding machine is shown generally at L and will be hereinafter referred to as lidding machine L. Lidding machine L comprises, in combination, a frame F, a magazine M, a drop chute assembly D and a conveyor assembly C, all so cooperatively associated as to interfunction in the hereinafter described manner to achieve the purposes of this invention.

Lidding machine frame F consists of a basic skeleton of generally box-like form provided with certain structural appendages intended for purposes subsequently to be described. The four corners of the basic skeleton are formed by two pairs of upright sections of angle iron 26 and 28, a representative one of each pair being shown at the left and right side, respectively, of FIGURE 1. Welded at each end to one of each of these pairs of upright angle sections and running horizontally, and mutually parallel, are four sections of angle iron 30, each of the same cross-sectional size and shape as the upright sections of angle iron joined thereby. Two of angle iron sections 30 join the tops of the pairs of upright angle iron sections 26 and 28, respectively, the other two connecting the upright angle iron sections part way down their lengths and directly underneath the first two, all as shown in the drawings, and particularly FIGURE 2.

Upright angle iron sections 26 and 28 are oriented with their corners so inturned that one flange on each of the separate pairs is planarly parallel to a flange on the other one of that pair and its other flange is planarly parallel with one flange on one of the remaining pair, all as the drawings clearly show. The horizontally extending angle sections 30 are each positioned with one flange horizontally, and the other vertically, disposed and with the outer surface of its vertically disposed flange flush with that of a flange of each of the upright angle sections with which it is in contact.

Spaced just inboard of upright angle sections 26 (sometimes hereinafter referred to as upright members 26), and welded to the vertically disposed flanges on each of angle sections 30, is a vertically disposed metal plate 36. Plate 36 is of rectangular shape, positioned with its upper edge at substantially the same level as the upper ends of upright members 26, and of sufficient dimension in the vertical direction (width) to extend slightly below the lower two of angle sections 30, all as shown in the drawings. Included as a part of the frame F assembly are a shelf 46, with a downturned flange weldably secured to upright angle sections 28 (sometimes hereinafter referred to as upright members 28) and a horizontal shelf segment extending away therefrom in the direction of upright members 26. Shelf 46 serves simultaneously as an integral part of the frame F structure and holding means for a motor 20, which latter comprises, as will be seen, a part of magazine assembly M. A pair of angle iron cross pieces 38 serve to join upright members 26 and 28, respectively, the cross pieces being welded at each end to an appropriate one of the upright members at a position substantially below the bottom edge of end plate 36. In addition to acting as brace, or strut, members for the main skeleton of the lidding machine frame, cross pieces 38 serve to support a metal conveyor belt support frame 48, later to be described in detail, in the manner illustrated in FIGURES 2 and 3.

Forming a part of the frame F structure is a pair of chock braces 40 comprising sections of angle iron, each welded at one end to an appropriate one of upright members 26 and 28 and running inboard therefrom towards conveyor belt support frame 48. The chock braces each comprises an elongate section 42 and a short beveled segment 44 of angle iron, the former being cut at an angle at one end to permit the complementary interfit between it and the latter illustrated in FIGURE 2, the two parts being welded together in the just-indicated manner to provide a flat bearing end, as shown at 44a, for each of said chock braces.

Chock braces 40 are positioned parallelly to cross pieces 38, and at such vertical distance thereabove as to butt against the upper confronting side of belt support frame 48 in the manner illustrated in FIGURE 2. The lengths of the chock braces are adjusted to assure tight friction contact between their flat ends and the belt support frame, whereby the braces serve to tightly jam the latter into its proper position in the lidding machine and hold it there. When this friction fit is sufficiently tight, no auxiliary fastening means are necessary between the chock braces and belt support frame, although it is, of course, within the scope of the invention to provide such means. In the latter connection, for example, weld or bolt fastening means could be employed to enhance the friction gripping effectiveness of the chock braces on the belt support frame.

As will be apparent from the foregoing, considered in conjunction with the drawings, frame F has a generally box-like outline and is longer than it is wide, one end being laterally defined by the two upright members 26 and the other by the upright members 28, and the resulting sides each by an upright member 26 and the closest one of upright members 28. Weldably attached, at its upper end, to the upper of the two angle sections 30 seen in FIGURE 3, and depending vertically downwardly therefrom not far from the left end of frame F, is a relatively short section of angle iron 32. Weldably attached to the bottom of angle iron section 32 in such a way as to extend inwardly, into the space surrounded by frame F, is a separate section 34 of angle iron of equivalent cross-sectional size to said section 32.

Angle iron sections 32 and 34 are so sized and positioned as to form a bracket for the partial support of a lid stack support member 3, subsequently to be described in detail. The position of lid stack member 3 is so clearly shown in FIGURES 1 and 2 as to make further description of angle iron sections 32 and 34 presently unnecessary, except, perhaps, for the comment that the inner end of section 34 is weldably secured to lid stack support member 3, the latter being, as the drawings show, a section of angle iron with one flange vertically, and the other horizontally, disposed. Lid stack support member 3 is, as the drawings show, so oriented as to present the outer surface of its vertically disposed flange to the adjacent end of angle iron section 34 to provide the site for the above-indicated welding connection therebetween.

Upright angle iron sections 26 and 28 are all of the same height, and their lower ends are adapted for firm anchoring to a level foundation surface to permit satisfactory operation of the lidding machine. Additional bracing and support structure of a type obvious to those skilled in the art to which this invention pertains in the light of present teachings, hence unnecessary to further describe here, is hidden from view, in FIGURE 1, between the planarly parallel flanges of upright members 28 of frame F.

Magazine assembly M comprises a pair of magazine rollers 2, a drive motor for the rollers 20, and a gear box 21 through which the rollers are driven by the motor. Magazine rollers 2 are of metal construction; mounted horizontally, parallelly and at the same elevation within frame F; and so oriented and sized as to extend longitudinally throughout substantially the entire length of the frame. The rollers are equally sized, and each comprises a central shaft and a thick-walled roller sleeve, the sleeve being press-fitted onto the shaft and the shaft extending from the sleeve into gear box 21 for hook up with a driving gear at one end extending from the sleeve into a bearing appropriately mounted in place 36 at the other end. The weight of gear box 21, as well as a proportionate share of the weight of magazine rollers 2, is supported in part by the shelf 46 structure and in part by that previously mentioned portion of the frame F structure between its upright members 28 which is hidden from view in FIGURE 1.

The magazine rollers 2 are spaced sufficiently far apart to support, in friction roll relationship, a stack 1 of container lids of appropriate size for handling by the lidding machine, all as illustrated in FIGURES 1 and 2, and particularly the latter. For proper operation of the machine, each of the container lids in the stack must be in axial alignment with all others so that the axis of the stack as a whole is parallel to the magazine roller axes, again as illustrated in FIGURES 1 and 2. Further, for a reason subsequently to be explained, the stack must ride as far left as possible, in reference to its FIGURE 1 position, on the magazine rollers 2. Lid stack guide member 3, as can be seen particularly well in FIGURE 2, is positioned with its vertically disposed flange depending downwardly from its horizontally disposed one, and the latter extending to near touching contact with the cylindrical outer boundary of the stack of container lids for the purpose, now obvious, of safeguarding against migration of the lids out of their seat on the magazine rollers and up over the outer surface of the roller shown to the right in FIGURE 2.

The lid stack guide member extends parallel to the magazine rollers, from touching contact at one end, the left in its position as seen in FIGURE 1, with the outer surface of a cam cover 4, later to be described, to termination at a point of anchoring support at its other end between upright members 28. As in the case of the previously mentioned frame structure between upright members 28, the lid stack guide anchoring support particulars will be here omitted as unnecessary in view of the obviousness of such particulars to those skilled in the art in the light of present teachings. As FIGURE 1 makes evident, angle iron section 34 connecting lid stack guide member 3 with the vertically disposed angle iron section 32 has one flange vertically, and the other horizontally, oriented and a small segment of the former (vertically oriented flange) cut away at its inwardly disposed (toward the viewer in FIGURE 1) end, to leave a segment of the latter (horizontally oriented flange) of sufficient size to overlie a horizontally disposed flange of the lid stack guide member and permit those parts to be fastened together by nut and bolt means 50 in the manner illustrated in FIGURE 1, all involved elements being cooperatively sized, shaped, positioned and oriented to fit together for assembly in the above-described, and drawing-illustrated, fashion.

As will by now be apparent, the function of magazine rollers 2 is to bring about rotation of the stack 1 of container lids by rotating in friction rolling contact therewith. To make this possible, the rollers are gear-driven to turn in a clockwise direction, as viewed, and the directional arrows indicate, in FIGURE 2, when lidding machine L is operating, as a result of which the container lids also turn (under the above-hinted-at friction-drive inducement by the rollers) but in the opposite, or counterclockwise, direction, again as viewed in FIGURE 2. The direction of rotation thus induced in the stack of container lids creates a tendency for the lids to ride up on the roller to the right in FIGURE 2, a tendency which lid stack guide member 3, as previously indicated, effectively controls. In the latter connection, the lid stack guide member is, as FIGURES 1 and 2 well illustrate, situated sufficiently close to, and high enough above the axis of, the stack of lids to serve its purpose of keeping the latter from riding out of its seat on the magazine rollers.

The speed of rotation of magazine rollers 2 is adjusted to assure satisfactory operation of the lidding machine, during which the forwardmost one (the furthest to the left, as seen in FIGURE 1) of the stack of container lids on the magazine rollers is repeatedly sheared therefrom for automatic delivery to a container simultaneously passing through the machine, all of which will be treated in greater detail in the description of the manner of functioning of the machine to follow. The container lids are of the type having a round flat top and a downwardly depending flange, the flange depending from the periphery of the top and converging slightly inwardly in the downward direction to give it a conically tapering configuration. The lids in stack 1 are arranged with their flange edge sides forward, or to the left as seen in FIGURE 1, and, as a result of their tapering-flange configurations they ride forwardly, or, again, to the left as seen in FIGURE 1, on the rotating magazine rollers during operation of the lidding machine. The lids are thus automatically fed by the rollers to the lidding operation of lidding machine L when the latter is in use as taught herein. Centrifugal force keeps the container lids in stack 1 rolling on their edges, in the manner illustrated in the drawings, when the lidding machine is operating.

Fastened flush against the right portion of the inward face of end plate 36, is a metal cam plate 5 with squared upper part, sides of differing length and a lower periphery of mostly arcuate configuration, all as illustrated in FIGURE 2. The arcuate portion of the cam plate curves upwardly from a flat segment joining it to the bottom of the short (left) side and then downwardly to a point at the same level as, and slightly to the left of, the bottom of the long side, of the plate, again as illustrated in FIGURE 2. Also fastened flush against the inner face of end plate 36 is a small, flat metal block 52 of rectangular shape and the same thickness as the cam plate. Block 52 and cam plate 5 are each fastened in place against the end plate by welding means, the former in longitudinally vertical position below the magazine roller shown to the right in FIGURE 2 so that a line coextensive with its right edge, as seen in that figure, is substantially tangent to said roller when extended vertically upwardly beyond the top edge of the block. The relative positions and configurations of cam plate 5, the magazine roller to the right in FIGURE 2 and block 52 are such as to generally define a curving pathway of such width and direction as to admit a container lid the size of those in stack 1 flatwise and guide it, in the manner hereinafter described, through an arcing and then downwardly descending path of travel to the bottom of end plate 36.

Partly overlying the faces of cam plate 5 and block 52 which can be seen in FIGURE 2, and fastened flushly thereagainst by means of screws 54 as shown, is a plexiglass cover 4. Plexiglass cover 4 is sized to substantially cover the aforesaid pathway defined by cam plate 5, the magazine roller to the right in FIGURE 2 and block 52, and it is peripherally shaped to fit partially around, but with sufficient clearance to avoid risk of binding contact with, the aforesaid magazine roller and the stack 1 of container lids, all as illustrated in FIGURE 2. Cam plate 5 is thick enough so that the aforesaid pathway partially defined thereby is converted into a slot-like container lid passageway by emplacement of plexiglass cover 4 thereover in the above-described, and drawing-illustrated, manner. This slot-like passageway, or, more properly, the structure defining it, comprises the major part of drop chute D assembly (sometimes hereinafter referred to simply as drop chute D), the remaining part consisting of an angled plate 8 and a slide 10. It will thus be apparent that end plate 36, previously described as a part of frame F, serves, also, in a sense, as a part of drop chute D.

Angled plate 8 is a rectangularly shaped piece of relatively thin metal plate which is fastened flush against the lower edge of the surface of end plate 36 opposite to that forming a defining boundary of the aforesaid slot-like passageway by screw fastening means 56, all as shown in FIGURE 3. Angled plate 8 is shaped and positioned to depend vertically downwardly past the lower edge of end plate 36 to about its own midsection, with its side edges vertically disposed in underlying relationship to the side edges of the lower end of the aforesaid slot-like passageway under cam cover 4, from whence it bends sharply inwardly, to the right as seen in FIGURES 1 and 3, through an acute angle to form a downwardly sloping deflector segment 8a having a purpose and function hereinafter to be described.

Slide 10 comprises an elongate, channelure member, width-dimensioned to fit snugly between a pair of parallel wall members 22 supporting roller equipment forming a part of conveyor assembly C, later to be described, and having a broad bed 10a and shallow upstanding side flanges 10b. The slide is fixedly secured, by welding means, to a supporting cross piece 80 bent into an L-shape at each end and there welded to the inner sides of said wall members, respectively, one such weld site being shown in FIGURE 3, all involved parts being so oriented as to position the slide in upwardly, and left-wardly (as viewed in FIGURES 1 and 3), inclination from its lower end. The slide is of such length as to extend from an upper terminus to the left of angled plate 8, as viewed in FIGURES 1 and 3, downwardly under the plate to a lower terminus situated, as indicated above, between wall members 22. Laterally, the slide is oriented symmetrically about a plane vertically bisecting angled plate 8 and dimensioned so that its upstanding side flanges 10b are spaced outwardly from the side edges of the plate, all as illustrated in FIGURE 2. The slide is positioned sufficiently close to the lower edge of angled plate 8 to conveniently receive container lids therefrom when the lidding machine is functioning as taught herein.

Fixedly secured to the flanges 10b of slide 10, near their upper ends, are two flat, elongate lid guides 9. Lid guides 9 are symmetrically disposed about the longitudinal axis of slide 10, each curving from its point of attachment to a slide flange through a relatively sharp bend and then tapering steeply to the lower end of the slide bed. As FIGURE 2 illustrates, lid guides are oriented edgewise on the slide bed and converge slightly in the steeply tapering segments between their upper bend sections, referred to above, and their lower termini. It will thus be seen that the lid guides form a funnel-like restriction within the channelure confines of the slide, the purpose of which will shortly be explained.

Lid guides 9 are of metal construction and resilient character, being flexibly movable about the sharp bends at their upper ends to provide yielding side barriers for the channel-like interior of slide 10. To augment the strength and durability of the flexible lid guides, each is mounted to bear against a spiral compression spring 58 secured in axially perpendicular relationship to, and near the midpoint of, a flange 10b of the slide, the two spiral compression springs being so secured to the opposite flanges of the slide in axially coextensive relationship, as illustrated in FIGURE 2. Slide 10 forms the bottom element of drop chute D, its function being to deliver lids descending thereonto from the aforesaid slot-like passageway via angled plate 8, in a manner subsequently to be discussed in greater detail, to open containers passing through the lidding machine on conveyor assembly C, also in a manner subsequently to be discussed in greater detail.

Conveyor assembly C consists essentially of a conveyor belt 18, and its support structure, driving means and auxiliary hardware and equipment, subsequently to be described; and cooperating apparatus for pressing lids delivered via slide 10 to the conveyor assembly onto open containers passing through the lidding machine on said conveyor belt. Conveyor belt 18 is so sized and aligned as to pass longitudinally through the lidding machine frame with its axis in the same vertical plane as that of the longitudinal axis of slide 10, all as illustrated in the drawings and particularly FIGURE 2. This arrangement permits the proper routing of lids by slide 10 to containers moving on conveyor belt 18 during operation of the lidding machine, as will be better understood in the light of subsequent disclosures herein.

Conveyor belt 18 is sufficiently long to permit the sequential loading of packed, unlidded containers, such as represented by containers 23 of the drawings, thereonto at a point far enough removed from the exit end of slide 10, which is also as previously indicated, the exit end of drop chute assembly D, to assure a smooth and trouble-free inflow of such containers to the operating machine. Conveyor belt 18 is of conventional rubber-covered friction-bottomed belting construction and mounted on two horizontal spaced end pulleys 25, one of which is shown on FIGURE 2, rotatably mounted at either end of the previously mentioned belt support frame 48 in such fashion as to permit belt movement in the hereinafter described manner. Belt support frame 48 is an elongate steel structure of hollow interior, open-end configuration and rectangular cross section, all as illustrated in the drawings, considered in conjunction with the present description. As previously explained, the belt support frame is secured in place in the lidding machine L by means of two angle iron cross pieces 38 and a pair of cooperating chock braces 40, the cross pieces and braces being employed for this purpose in a manner also as previously explained.

As the drawings indicate, conveyor belt 18 functions by moving to the right, as seen in FIGURE 3, along the top of support frame 48, and to the left internally of the frame and generally near its bottom, the upper level of the moving belt serving to convey the aforesaid containers through the lidding operation of this invention. The belt is situated to the right of center in frame 48, as seen in FIGURE 2, as it obviously must be to assure proper belt alignment with slide 10 to permit lids from the slide to fall naturally into proper lidding position on containers traveling thereunder on the belt 18, as the lid shown at 1a (and hereinafter referred to as lid 1a) on FIGURE 2 is doing.

Belt 18 receives its power from a driving roller 17, positionally oriented within frame 48 as shown in FIGURE 3, and is maintained under proper driving tension by a pair of idler tension pulleys 16 rotatably mounted either side of the driving roller, also as shown in FIGURE 3. Driving roller 17 is driven by electric motor means, not shown, drivingly connected to a shaft 60 forming the core of the roller. Shaft 60 extends concentrically outwardly from the ends of the roller to a pair of bearings 62 which rotatably support it and are mounted outboard of the side walls of frame 48, only one of which can be seen on the drawings, the bearing mount sides being, of course, symmetrically disposed about a plane vertically bisecting frame 48 in the longitudinal direction.

Conveyor belt 18 is width-dimensioned to accommodate the bottom of a container 23 with very little room to spare, as FIGURE 2 best illustrates. Parallelly mounted above frame 48, on a plurality of vertically disposed legs 64 (only one of which can be seen on those portions of the lidding machine shown on the drawings), is a pair of guide rails 19. Guide rails 19 are made of metal, although any other suitable material of construction such as, for example, a relatively hard plastic, hard rubber, or the like, could be employed for that purpose if desired. The guide rails are mounted just outboard of the lateral edges of conveyor belt 18 and at a sufficient height to permit the passage of containers 23 traveling on the belt therebetween, all as illustrated in FIGURE 2. As the drawings show, containers 23 have slightly tapering sides, thus limiting the height to which the guide rails can be raised at any given lateral spacing without hindrance to movement of the containers on the conveyor belt. While the drawing-illustrated positional and interspatial arrangement of the guide rails is a preferred one for use where containers the size of containers 23 are being processed by the lidding machine, it will be apparent that other arrangements can be substituted therefor for use with containers 23 or containers of a different size and/or shape. In this connection, the machine can be made with guide rail legs which are adjustable in and out, which feature (guide rail leg adjustability) I have, incidentally, incorporated in working models of my invention hereinafter to be described.

To maintain lidding machine L in continuous operation, open containers to be lidded are fed, in properly spaced relationship, to the feed end of conveyor belt 18, the left end of the belt as seen in its FIGURE 1 or 3 position, from whence they are conveyed by the belt, between guide rails 19, past a microswitch 11. As each container passes the microswitch, it causes the switch to actuate a lid-ejecting mechanism, which then ejects the forwardmost lid from the stack of lids on magazine rollers 2 toward the previously-described slot-like passageway between end plate 36 and plexiglass cam cover 4. The microswitch and lid-ejecting mechanism form a part of the lidding machine which is difficult to classify in terms of association with any other part of the machine, hence will be herein considered as in a separate class from the machine sub-division categories previously mentioned and referred to as lid ejecting means E.

The ejected container lid passes into and through said slot-like passageway, in a manner as hereinafter described, and shoots down onto angled plate 8, which deflects it from vertical fall and guides it to a flat position on the bed of slide 10, as illustrated by the FIGURE 3 position of lid 1a. The lid reaches this position on the bed of the slide (actually partly on, and partly extending past the lower edge of, the bed, as FIGURE 3 illustrates), just as the leading edge of the rim of the container which triggered its ejection from stack 1 on magazine rollers 2 comes into position to catch the inner wall of the leading segment of the downturned flange of the lid and thereafter pull the lid with it on the conveyor belt to a lid-pressing operation, hereinafter to be described. In this connection, and as will be apparent from the drawings, containers 23 have beaded rims, which make it easier for them to catch lid flanges in the just-described fashion and serve strengthening, and other, purposes of obvious import.

To assure a good tight fit of the lids on the containers after the aforesaid lid pressing operation, the former are preferably made of a resilient plastic of suitable type for the purpose and sized slightly smaller than the container rims on which they are to be pressed. The containers are preferably made of a relatively hard plastic which may or may not be transparent, although transparency is common in many such containers. The lidding machine is not limited to the processing of lids and containers of these particular types, however, and can be employed for the emplacement of lids of any suitable construction, such as, for example, the above-described lids or lids made of stiff paper, waxed cardboard, thin metal, or the like, on any containers receptive of such lids, including, in addition to plastic containers, those made of glass, waxed cardboard, or the like.

Rotatably mounted in the upper space between the previously mentioned wall members 22 is a lid press drive roller 13 and an idler press roller 15, the two rollers being positionally oriented and relatively sized as shown in FIGURE 3. To briefly digress, wall members 22 are anchored to the top of conveyor belt frame 48 by welding, or other suitable, means, in parallel relationship and spaced sufficiently far apart to provide adequate room for movement of the conveyor belt and containers 23 therebetween, all as illustrated in FIGURE 2. The wall members are of equivalent size and shape, each being of rectangular form except for a step-like recess in its upper left quadrant, as viewed in FIGURES 1 and 3, respectively, and being oriented in profile symmetry with the other about a vertical plane spaced midway therebetween. Bracing support for the wall members is provided by a pair of angle iron sections 82, weldably fastened to, and joining, the corresponding upper corners of their unrecessed portions in the manner illustrated in FIGURES 1 and 3.

The relative positioning of slide 10 and wall members 22 is as illustrated in FIGURE 3, that is, with the previously-mentioned slide supporting cross piece 80 bridging the wall members from points of equal elevation a short distance below the top edges of the recessed segments of the wall members and all other geometrical relationships of the involved parts being as shown, whereby the slide, as viewed in FIGURE 1, inclines diagonally downwardly through the coinciding recess spaces in the wall members and generally toward the coinciding corners of those spaces. A flexible deflector member 12 is fixedly secured to the left one of the pair of angle iron sections 82 joining the upper corners of the wall members, which section is, as FIGURES 1 and 3 show, disposed directly over the path of travel of container lids leaving slide 10 on their way to meeting contact with containers traveling on conveyor belt 18. Deflector member 12 is a bent piece of thin, flexible sheet metal having one dimension approximately equal to the diameter of container lid 1a, and fastened along one border by welding, or other suitable, means, to the above-identified angle iron section 82 in the manner illustrated in the drawings. From where it is thus fastened to said angle iron section, the deflector member depends vertically downwardly towards slide 10 and then curves in a clockwise direction, as seen in FIGURES 1 and 3, through an arc of about 180°, after which it extends sharply upwardly, and to the left, to terminate in an outer edge of roughly the same elevation as its starting edge (that edge adjacent the left angle iron section 82), all as depicted in FIGURES 1 and 3. As will now be apparent, deflector member 12 serves as a flexible bumper to deflect impacting container lids downwardly and onto the slide, thereby preventing lid escape from, and interrupted operation of, the lidding machine.

Returning now to consideration of rollers 13 and 15, those members are, as FIGURE 3 illustrates, mounted transversely between, and in axially perpendicular relationship to, wall members 22. Drive roller 13 is mounted just forward, to the right as seen in FIGURE 3, of the lower end of slide 10 and at the proper height to press firmly down on containers 23 travelling on conveyor belt 18 just after they have caught lids from the slide in the above-described manner. The drive roller rotates counter-clockwise, as seen in FIGURE 3, and gradually presses the lid down on each container passing thereunder, stretching the lid as necessary to make it fit over the rim of the container. Before each container has passed completely under roller 13, its leading edge contacts roller 15 which is mounted at a convenient height to roll with the forward movement of each container and provide additional downward pressure on its lid.

Fixedly secured to a rod 66 running transversely between, and fastened at its ends to, wall members 22, is a spring-loaded anti-kickup baffle 14. Anti-kickup baffle 14 is a sheet of spring metal having a bead-like roll in its bottom end and positioned at the proper elevation to provide yielding downward pressure on the lidded containers moving between lid press drive roller 13 and idler roller 15 on conveyor belt 18 for the purpose of preventing snap-up of the container lids before they are clinched into position on the containers by the idler roller. Drive roller 13 receives its power, through sprocket linkage means not shown from the same electric motor source as does belt driving roller 17. In this connection, it is of interest to point out that, as FIGURE 3 shows, drive roller 13 and belt driving roller 17 are of the same diameter. For obvious reasons, the two rollers are driven at the same speed, this being accomplished through proper design of the power transmission systems interconnecting the involved power source and rollers, the achievement of which is, in the light of present teachings, well within the ordinary capabilities of the routineer in the art with which the present invention is most nearly concerned. A preferred route for the transmission of power in such a system is from the aforesaid motor to belt roller 17 and from the latter to lid press drive roller 13 through properly designed sprocket linkage means therebetween.

Fixedly positioned atop conveyor belt frame 48, outboard of frame F in the upstream direction of belt 18, is the previously-mentioned microswitch 11. Microswitch 11 has an actuating arm 68 projecting horizontally therefrom in the direction of the belt, as illustrated in FIGURE 2, the switch being positioned sufficiently close to said belt to permit contact between the outer tip of its actuating arm and containers moving thereon (again as illustrated in FIGURE 2) for switch actuating purposes. As previously indicated, microswitch 11 is one component of the lid ejecting means of lidding machine L, which means functions, also as previously indicated, to feed individual lids from stack 1 on magazine rollers 2 into the slot-like passageway of drop chute assembly D described hereinabove. The other components of the lid ejecting means are a lid ejecting trigger 6 and a magnetic solenoid 7, along with the necessary and auxiliary hardware and equipment to permit its proper installation and functioning.

Lid ejecting trigger 6 is an elongate, bar-like member with one end pivotally secured to end plate 36 by means of a pivot screw 70, all as shown in FIGURE 2. The end of the lid ejecting trigger opposite to its pivoted end curves upwardly and terminates in a flat, upwardly facing edge segment adapted to abut against the flat edge of the left portion of the bottom of cam plate 5 when the trigger is supported at its normal position of rest between triggering movements induced therein by stimuli transmitted from microswitch 11 in a manner soon to be revealed. Support for the trigger at rest is furnished by a small spiral spring 72 having its upper and fastened to end plate 36 and its lower end attached to the outer flank of the trigger at a point slightly more than halfway between its pivoted and its other end, all as illustrated in FIGURE 2. The lid ejecting trigger when so supported is in a substantially horizontal position, with its right end as viewed in FIGURE 2 biased upwardly against the aforesaid portion of the bottom edge of cam plate 5 by spring 72. The curved shape of the non-pivoted end of the lid ejecting trigger gives it a cam-like outer edge 6a, which contributes to its functioning effectiveness, as will be seen.

As FIGURE 1 shows, lid ejecting trigger 6 has its inner side substantially flush with end plate 36. The trigger does not fit so tightly against the end plate, however, as to prevent relatively free movement therebetween. As FIGURE 2 shows, the lid ejecting trigger has the cam-like edge 6a of its nonpivoted end in close, but nontouching, proximity to the forwardmost one of the lids in stack 1, that farthest left in FIGURE 1, and sufficiently elevated above a plane passing horizontally through the axis of the stack to assure extension of that end of the trigger far enough over the periphery of the lid in question to permit contact between the trigger and lid when the former is moved in a clockwise direction, as seen in FIGURE 2, around pivot screw 70.

Fastened to the lower edge of end plate 36, generally underneath the left portion of lid ejecting trigger 6, as seen in FIGURE 2, is a plate 74, having its inwardly facing, to the right in FIGURE 1, surface coplanar with the inwardly facing surface of the end plate. Mounted on this plate is a magnetic solenoid 7. Solenoid 7 is connected in circuit with microswitch 11 and a suitable power source so that actuation of arm 68 of the microswitch by a passing container 23 on conveyor belt 18 causes the core of the solenoid to move downwardly. Connecting the top of the solenoid core with the outer side of lid ejecting trigger 6, in the manner shown in FIGURES 1 and 2, is a chain of such length as to stretch snugly, but not tightly, between the solenoid core and the lid ejecting trigger when the latter is held in its horizontal position of rest by spring 72, all as illustrated in FIGURE 2. Electric current is supplied to the microswitch-solenoid circuit from a conventional source, not shown. The necessary wiring for the circuit is omitted since only the ordinary skill of the routineer in the art is, in the light of present teachings, required for the provision of such wiring.

As will now be apparent, actuation of microswitch 11 by a passing container on conveyor belt 18 causes the core of solenoid 7 to move in such a way as to pull lid ejecting triger 6 (through chain 76) downwardly around pivot screw 70 for a short distance in the clockwise direction. The arc distance through which the lid ejecting trigger moves, when thus actuated, is sufficient to cause its cam-like edge 6a to sharply contact the nearest of the lids in stack 1 on magazine rollers 2, which stack is, it will be remembered, concurrently rotating in the counterclockwise direction, as viewed in FIGURE 2, as a result of the clockwise rotation of the magazine rollers. The sharp contact of the end of the lid ejecting trigger with the rotating lid in stack 1 results in a sudden squeezing, or pinching, of the lid between the end of the trigger and the right-hand magazine roller shown in FIGURE 2 and causes the lid to shoot upwardly under the influence of the clockwise movement of the roller in frictional contact therewith. The upwardly moving lid soon reaches the curved part of the lower edge of cam plate 5, which, as previously indicated, forms the upper boundary of the slot-like passageway in drop chute D, and thereafter is induced to rolling movement around the top part of the aforesaid roller in friction contact with the curving cam plate edge, this movement resulting from the intentionally close spacing of the edge to the roller (the area therebetween being, of course, the upper, curving portion of said slot-like passageway) and the clockwise rotational movement of the latter.

When the lid has rolled to the rear side of the aforesaid roller, it leaves the curving portion, and reaches the downwardly extending part, of the slot-like passageway, at which point it is suddenly released from the binding restriction between the cam plate and roller and shoots downwardly with quite a bit of force toward the bottom of drop chute D, the spacing between block 52 and cam plate 5 in the downwardly extending portion of the slot-like passageway being sufficiently nonrestrictive to permit such rapid and unhindered travel of the lid. The above-described lid ejecting and routing means of my lidding machine are singularly effective for purposes of this invention and completely unique insofar as I am aware.

The manner of operation of lidding machine L will now, it is believed, be apparent. In brief summary, conveyor belt 18 is kept continuously loaded, during such operation, with properly spaced containers to be lidded, the loading being accomplished manually, by means of a cooperating infeed belt, or in any other suitable fashion. The unlidded containers are placed on the conveyor belt at its load receiving end, as identified above, after which they travel in sequence past microswitch 11 and sequentially contact the actuating arm of the latter, thereby sequentially energizing solenoid 7. Each time it is energized by a container passing microswitch 11, the solenoid jerks lid ejecting trigger 6 down, thereby causing the latter to "kick" the end one of the stack of container lids on magazine rollers 2 into the slot-like passageway of drop chute assembly D, through which passageway it is then rapidly driven by an appropriate one of the magazine rollers, all as previously described. The lid exits from the slot-like passageway onto angled plate 8 which deflects it in the proper direction for "flange-down" delivery to slide 10. By this time, the unlidded container which actuated the microswitch to start the above-described sequence of lid ejecting events has progressed along the conveyor belt to a point at which its leading edge comes into contact with the inner side of the front portion of the flange of the lid on slide 10, after which the container and lid pass under drive press roller 13 and idler roller 15, in that order, all as previously taught herein. Finally, the container, now lidded, continues to travel to the right, as seen in FIGURE 3, along the conveyor belt until it reaches the unloading end of the latter, now shown, whereat it is removed for appropriate disposition. For purposes of distinguishing the lidded from the unlidded container on the drawings, the former is there designated by the numeral 24, the numeral designation 23 being, of course, reserved for the latter.

Although, as will be apparent, the lidding machine of this invention is adaptable for use in the packaging of many products (mostly, but not exclusively, in the food line), it was designed primarily for use in the date packaging field. To this end, I have built and tested, under actual assembly line conditions in a date porcessing plant, working models of machines of essentially the same design as lidding machine L and suitably scaled to process containers of 10–12 ounce and 1½ pound capacity respectively, the former holding either 10 ounces of pitted or 12 ounces of hydated (unpitted) dates.

In will be evident from the foregoing that the lidding machine of this invention is, at least in its date packaging forms of above reference, sufficiently small to require bench mounting, at about waist height, for optimum plant installation and use purposes. To give a better idea of the size scale of such machines, certain parts dimensions and other qualifying particulars of a lidding machine designed and built for handling the above-mentioned 10–12 ounce capacity containers, and actually used for this purpose in a processing plant, are listed below. The following list is not a comprehensive set of machine specifications, but only a representative sampling of certain of its dimensional, and other, particulars sufficient to give a general idea of the size, power requirements, etc., of the machine. To avoid confusion, some of the parts of the machine are identified in the following list by the reference numerals employed in the drawings to designate their lidding machine L counterparts.

Part or component:

| | Size or power |
|---|---|
| Drive press roller 13 | 3″ roller diameter; ⅝″ shaft diameter. |
| Belt driving roller 17 | 3″ roller diameter; ⅝″ shaft diameter. |
| Lid guides 9 in slide 10 | 8″ long. |
| Magazine rollers 2 | 2″ roller diameter; ¾″ shaft diameter. |
| Power source for magazine rollers | ½-h.p. electric motor. |
| Belt drive motor | ¼-h.p. gear motor. |
| Conveyor belt 18 | 4″ wide. |

In addition to the above-discussed model of my machine, I have built and tested, under actual date processing plant conditions, another lidding machine similar in all essential respects thereto, except with a 6-inch conveyor belt instead of a 4-inch one, to suit it for use in the processing of 1½-pound containers of the type previously mentioned.

I have determined a practical operating speed for the magazine rollers of lidding machine such as those just described to be about 900 r.p.m. This is primarily a matter of practicality, rather than operational criticality, however, since the effect of a gradual slowdown of the magazine rollers from that speed is merely one of slowing product delivery, and of a speedup, a higher machine loading demand with its attendant difficulties. In this connection, I have found a processing rate of 100 containers per minute to be a good, practical working pace for the lidding machine in an assembly line date packaging operation. The processing rate of the lidding machine is effected to some extent by variation of its magazine roller diameter, but this effect is so slight as to be essentially negligible, at least in the case of the lidding machines with which I have had date packaging experience.

As previously indicated, the conveyor belt of lidding machine L can be loaded in any manner conducive to proper spacing of the feed contains on the belt. In this connection, I have found it preferable to feed the containers to the lidding machine by means of a cooperating infeed belt travelling at a slower rate of speed than the conveyor belt on the machine, the infeed belt being, in turn loaded by hand. Where this system is employed, the infeed belt is installed wtih its dumping end adjacent the feed end of the conveyor belt of the lidding machine and kept loaded, during operation of the machine, with a line of closely adjacent containers. I have determined that, under these operating circumstances, the conveyor belt speed must be at least four times the speed of the infeed belt to get good separation between the containers going into the lidding machine.

For best results, at least in the case of lidding machine such as those employed by me for the above-discussed date packaging purposes, the cam plate corresponding to cam plate 5 of lidding machine L should be about 1/16 inch thicker than the lids to be processed by the machine of which it forms a part. Excess cam plate thickness will not, however, present much difficulty until it reaches a point at which there is danger of two lids at a time entering, or attempting to enter, the slot-like passageway of drop chute assembly D. The cam plate can, of course, be made in varying thicknesses to accommodate lids of differing flange depths, such lids being available, as those skilled in the art are aware in a variety of flange depths.

The lidding machine of this invention is operable without a cam cover such as exemplified by plexiglass cam cover 4 of its illustrated embodiment, or, of course, with such a cam cover made of any suitable material other than plexiglass, as for example, plywood, or the like. End plate 36, or its counterpart on a machine other than lidding machine L, is preferably made of aluminum because of its light weight and freedom from rust. The end plate could, however, be made of any other material suitable for the purpose such as, for example, stainless steel (a serious contender where attractiveness of appearance is an important factor), etc.

This invention has been described in considerable detail in order to comply with the applicable patent law requirements by providing a full public disclosure of at least one of its forms. Such detailed disclosure is not, however, intended to in any way limit the broad features or principles of the invention, nor the scope of patent monopoly sought to be granted. Accordingly, while the invention has been herein illustrated and described in what is conceived to be a preferred and practical form, it is emphasized that departures may be made therefrom within the scope of the invention. Certain of these departures have already been mentioned, and others will occur to those skilled in the art in the light of present teachings. Exemplary of the latter are noncritical variations of the shapes of various parts of my lidding machine as illustrated in the drawings; the elimination of certain structural, or other, features of said lidding machine not critically essential to proper use and functioning thereof; the addition of useful, but noncritical, accessories to the machine; etc.

A specific example of the kind of modification contemplated above would be the provision of a machine similar to that illustrated in the drawings but with interchangeable belts of different sizes to accommodate different sized containers. Another example of such modification would be the omission of lid stack guide member 3 from lidding machine L, this being feasible because it would not render the machine inoperable. In this connection, the primary purpose of the lid stack support member is to prevent warped lids, when accidentally or otherwise loaded onto magazine rollers 2, from climbing over each other when the lidding machine is in operation. Further in the above vein, it would be within the scope of my invention to substitute a suitable roll for anti-kickup baffle 14 of lidding machine L, a substitution I have made with success on working models of my invention.

It is emphasized, in final summary, that the scope of my invention extends to all variant forms of its drawing-illustrated embodiment encompassed by the language of the following claims.

I claim:

1. Lidding means particularly suitable for the automatic pressing of round, peripherally flanged, friction fitting lids on containers, comprising, in combination:
   (A) conveyor means for moving said containers along a predetermined path;
   (B) lid magazine and feeding means for temporarily maintaining a supply of lids for said containers in edge-standing verticality above and to one side of said predetermined path and automatically causing the movement of lids, one at a time as needed, laterally and downwardly away from said supply in the direction of said path to a point of contact with the containers on the conveyor means in proper position to permit subsequent pressing of the lids into place thereon, comprising:
   (1) a pair of rotatably supported rollers positioned at the same level above, parallel to, and offset to the same side of said conveyor means, said rollers being adapted to rotate in the same direction at such speed, and being so spaced, as to cradle said lids in edge-standing verticality and in axially parallel relationship and friction rolling contact therewith, the lids remaining so cradled as a result of rotational movement induced therein by the turning motion of the rollers;
   (2) trigger means adapted to strike, when properly actuated, a preselected one of said rotating lids cradled by said rollers a glancing blow on its periphery with sufficient force and in a proper direction to exert enough pressure between it and the roller nearest said conveyor means to cuase said roller to urge the lid rapidly upwardly by virtue of its frictional contact therewith and the character of its rotating movement, the direction of the rotating movement of the roller being conducive to such upward lid travel under the indicated circumstances, comprising, in combination:
      (a) an elongate trigger member pivotally supported at one end in substantially coplanar relationship with the position of said preselected one of said rotating lids to be struck a glancing blow by said trigger means;
      (b) resilient support means so anchored and fastened to said trigger member as to continuously urge the latter into a substantially horizontal position with its nonpivoted end separately adjacent the upper portion of the periphery of that area occupied by said preselected one of said rotating lids to be struck a glancing blow by said trigger means; and
      (c) cooperating means for rapidly jerking the nonpivoted end of said trigger member downwardly through a small arc under a suitable actuating stimulus;
      (d) the trigger member being disposed laterally outwardly from said preselected one of said rotating lids in a direction opposite to the lateral direction of said conveyor means therefrom and all involved parts being so shaped and arranged as to assure striking of said preselected one of said rotating lids by the trigger member when it is jerked in the above-indicated fashion and upward movement of that lid to said entrance to said restrictive areaway between said stationary cam-like means and said roller;
   (3) stationary cam-like means properly configured and positioned relative to said roller to provide a diametrically restrictive areaway for the lid between it and the roller through a curving path of travel over and around the uper half of the roller in a plane substantially perpendicular to the axis of the latter; the entrance to the aforesaid restrictive areaway being so positionally fixed by said cam-like means as to catch the lid urged upwardly by said roller as a result of being struck by said trigger means and the tightness of lid fit within the areaway being such that the lid, once caught, is induced by said roller to pass through said areaway in mutually rolling contact with the roller and said cam-like means; and
(4) passageway means adapted to route said lid from the exit of the aforesaid restrictive areaway downwardly and into cooperating contact with a container in the conveyor means; and
(C) pressing means for pressing the lids on the containers at a point along said predetermined path as they move on the conveyor means.

2. Lidding means in accordance with claim 1 in which said cooperaing means for rapidly jerking the nonpivoted end of said trigger member downwardly comprises:
(1) a magnetic solenoid mounted underneath said trigger member in such position that its core is movable in the downward direction upon actuation thereof; and
(2) pull means so interconnecting the core of the solenoid and the trigger member that downward movement of the core upon actuation of the solenoid causes the nonpivoted end of the trigger member to be jerked downwardly through said small arc.

3. Lidding means in accordance with claim 2 in which said cooperating means for jerking the nonpivoted end of said trigger member downwardly includes, as solenoid-actuating means, a microswitch with a switch arm so positioned that each container moving along said conveyor means during operation of the lidding means brushes against said arm and thereby momentarily actuates said solenoid.

4. Lidding means in accordance with claim 3 having a vertically disposed plate defining the forward limit of travel of said lids cradled by said rotatably supported rollers and having said trigger member so mounted on said plate that it strikes the forwardmost one of said lids when jerked downwardly through said small arc.

5. Lidding means in accordance with claim 4 in which said passageway means adapted to route said lid from the exit end of said restrictive areaway downwardly and into cooperating contact with a container on said conveyor means comprises structure defining a slot-like passageway for said lid extending vertically downwardly to a first position above said conveyor means, and cooperating means for deflecting and routing lids exiting from said passageway to a second position whereat unlidded containers traveling on the conveyor means can sequentially catch the lids and pull them forwardly by riding to front edge contact with their inner flange surfaces and thereafter in such incipient interfit therewith as to invite subsequent pressing of the lids on the containers by said pressing means.

6. The lidding means of claim 5 in which said conveyor means comprises a conveyor belt and said pressing means for pressing the lids on said containers comprises roller mean positioned at the proper elevation to press and stretch the lids on the containers from front to rear as said containers travel thereunder on said belt.

7. The lidding means of claim 5 in which the cooperating means for deflecting and routing lids exiting from said passageway to said second position comprises an angled plate fixedly secured to the structure defining the slot-like passageway, at the exit end of said passageway, in such fashion as to provide a downwardly depending deflecting member for said lids, and a slide disposed underneath said angled plate; the slide being inclined with its lower end forward, in the direction of travel of said conveyor means, and the angled plate serving to guide said lids, by properly deflecting their paths of downward movement, from said passageway onto said slide.

References Cited

UNITED STATES PATENTS

| | | | |
|---|---|---|---|
| 2,942,395 | 6/1960 | Thoren | 53—316 |
| 3,137,982 | 6/1964 | Decker et al. | 53—316 |
| 3,332,210 | 7/1967 | Tordi | 53—316 |
| 3,345,801 | 10/1967 | West | 53—313 X |
| 3,350,842 | 11/1967 | Renish | 53—316 |

FOREIGN PATENTS 85,585   8/1958   Denmark.

TRAVIS S. M3GHEE, Primary Examiner

U.S. Cl. X.R.

53—316